United States Patent
Li et al.

(10) Patent No.: US 10,489,507 B2
(45) Date of Patent: Nov. 26, 2019

(54) TEXT CORRECTION FOR DYSLEXIC USERS ON AN ONLINE SOCIAL NETWORK

(71) Applicant: Facebook, Inc., Menlo Park, CA (US)

(72) Inventors: Xian Li, San Francisco, CA (US); Irina-Elena Veliche, Los Altos, CA (US); Debnil Sur, Menlo Park, CA (US); Shaomei Wu, Mountain View, CA (US); Amit Bahl, Pleasanton, CA (US); Juan Miguel Pino, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/860,362

(22) Filed: Jan. 2, 2018

(65) Prior Publication Data

US 2019/0205372 A1 Jul. 4, 2019

(51) Int. Cl.
*G06F 17/27* (2006.01)
*G06F 17/24* (2006.01)
*G06N 20/00* (2019.01)
*G06F 3/0481* (2013.01)

(52) U.S. Cl.
CPC ............ *G06F 17/273* (2013.01); *G06F 17/24* (2013.01); *G06F 17/274* (2013.01); *G06N 20/00* (2019.01); *G06F 3/0481* (2013.01)

(58) Field of Classification Search
CPC ..... G10L 15/187; G10L 15/19; G10L 15/193; G10L 15/197; G10L 15/20; G16H 50/20; G06F 19/3418; G06F 19/30; G06F 19/32; G06F 19/34; G06F 19/36
See application file for complete search history.

(56) References Cited

U.S. PATENT DOCUMENTS

| | | | |
|---|---|---|---|
| 6,676,412 B1* | 1/2004 | Masterson | G09B 7/02 434/169 |
| 2005/0251744 A1* | 11/2005 | Brill | G06F 17/273 715/257 |

(Continued)

OTHER PUBLICATIONS

Rello et al., "A Computer-Based Method to Improve the Spelling of Children with Dyslexia" copyright 2014 (Year: 2014).*

(Continued)

*Primary Examiner* — Andrew C Flanders
(74) *Attorney, Agent, or Firm* — Baker Botts L.L.P.

(57) ABSTRACT

In one embodiment, a method includes identifying a plurality of dyslexic users on an online social network. The plurality of dyslexic users may be identified based on content objects posted by these users over a particular time period, where the content objects may include one or more of word-level errors or sentence-level errors. A machine-learning model may be trained for text correction using a corpus of social network data, which may include at least the content objects with one or more of word-level errors or sentence-level errors, and a corresponding set of corrected content objects. A text string including one or more errors may be received from a client system associated with a first user. The text string may be transformed into a vector representation using an encoder of the machine-learning model. A corrected text string may be generated from the vector representation using a decoder of the machine-learning model.

20 Claims, 9 Drawing Sheets

(56) References Cited

U.S. PATENT DOCUMENTS

| | | | | |
|---|---|---|---|---|
| 2005/0257146 | A1* | 11/2005 | Ashcraft | G06F 17/273 715/257 |
| 2009/0249232 | A1* | 10/2009 | Lundy | G06F 3/0237 715/764 |
| 2010/0180198 | A1* | 7/2010 | Iakobashvili | G06F 17/273 715/257 |
| 2012/0141031 | A1* | 6/2012 | Boegelund | G06F 17/211 382/182 |
| 2012/0259620 | A1* | 10/2012 | Vratskides | G06Q 30/02 704/9 |
| 2012/0308970 | A1* | 12/2012 | Gillespie | G09B 5/06 434/236 |
| 2014/0127667 | A1* | 5/2014 | Iannacone | G09B 5/02 434/379 |
| 2014/0304200 | A1* | 10/2014 | Wall | G06F 19/3418 706/12 |
| 2015/0287043 | A1* | 10/2015 | Michaelis | G06Q 10/063 705/317 |
| 2016/0048504 | A1* | 2/2016 | Narayanan | G06F 17/2755 704/9 |
| 2017/0255689 | A1* | 9/2017 | Khatravath | G06F 17/30598 |
| 2017/0308654 | A1* | 10/2017 | Luz Rello-Sanchez | G06N 7/005 |
| 2018/0143760 | A1* | 5/2018 | Orr | G06F 3/04886 |
| 2018/0308473 | A1* | 10/2018 | Scholar | G06F 17/21 |

OTHER PUBLICATIONS

Drigas et al., "A Review on ICTs, E-Learning and Artificial Intelligence for Dyslexic's Assistance," Aug. 2013 (Year: 2013).*

Sterling et al., "Adult Dyslexic Writing," copyright 1998 (Year: 1998).*

Belk et al., "Towards Implicit User Modeling Based on Artificial Intelligence, Cognitive Styles and Web Interaction Data," Apr. 2014 (Year: 2014).*

Hox; "Computational Social Science Methodology, Anyone?" copyright 2017 (Year: 2017).*

Rello et al. "DysList: An Annotated Resource of Dyslexic Errors," May 24-31, 2014 (Year: 2014).*

Rello et al. "A Spellchecker for Dyslexia," Oct. 26-28, 2015 and copyright 2015 (Year: 2015).*

Tung et al. "Analyzing depression tendency of web posts using an event-driven depression tendency warning model" copyright 2015 (Year: 2015).*

* cited by examiner

| POSTS WITH ERRORS | CORRECTED POSTS |
|---|---|
| the scientists, psychologists, etc. they Do not know what is dylexia | The scientists, psychologists, etc. do not know what is dyslexia. |
| im happy because today was a good day!! ☺ | I'm happy because today was a good day!! ☺ |
| i swam at the beach I got a library card at that beach which has a lot of helpful FREE mathbooks (im so happy) | I swam at the beach. I got a library card at that beach, which has a lot of helpful FREE math books. I'm so happy. |
| yuo can find Me rite their... | You can find me right there... |
| i spoke to my professors with office hours | I spoke to my professors during office hours. |
| why cant aminals be treated like humans??? | Why can't animals be treated like humans??? |
| My parents, Grandparents, teacher all spank me and turn out pretty good even chrches spank if act up in bible study.... | My parents, grandparents, teachers all spank me, and I turn out pretty good. Even churches spank if you act up in bible study.... |
| ... | ... |

FIG. 2

TEXT CORRECTION FOR DYSLEXIC USERS ON AN ONLINE SOCIAL NETWORK

TECHNICAL FIELD

This disclosure generally relates to automatic text correction.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

People suffering from dyslexia (also referred to herein as dyslexic people or users) often have a hard time interpreting, reading, and writing certain words. For example, they often make punctuation mistakes, forget to put appropriate commas in sentences, period marks, make capitalization errors, switches orders of certain letters in a word, etc. An example of a sentence written by a dyslexic user may be "The scientists psychologists, etc they Do not know what Is dyslexia". As seen in this example, the sentence is poorly-written missing commas, periods, letters, and wrong capitalizations. A corrected version of this sentence would look something like this: "The scientists, psychologists, etc. do not know what is dyslexia." In particular embodiments, the social-networking system may provide an improved writing environment for these dyslexic users or more generally for people who have trouble with writing (e.g., may be due to their educational background or a particular language is not their first language). The social-networking system, in response to receiving a text from a user, may provide suggestions for text correction (e.g., grammar correction, spelling correction, punctuation correction, etc.) or in some instances, may automatically correct one or more errors in the text for the user since the dyslexic user may not be able to interpret or figure out the errors by themselves. In particular embodiments, the social-networking system may perform the text correction based on a machine-learning approach. The machine-learning approach may include training a sequence-to-sequence model using a corpus of social-network data (e.g., posts) containing incorrect sentences/words and their corresponding corrected sentences/words so that the trained model may automatically predict where one or more errors are in the written text and correct or provide suggestions to a user. In particular embodiments, an incorrect text and its corresponding corrected version may be provided by the same user (who is making one or more errors at the first place), and the model may learn this user behavior over time to correct future texts. As an example, a user may submit a first post on an online social network, learn that the first post contains certain errors, and then submit a subsequent post in response to correct the errors in the first post. This may be used by the model to learn various types of errors and what their corresponding corrections should be (e.g., by comparing the first and second posts by the same user). The text correction approach discussed in this disclosure is different from existing correction applications in that the existing applications use a rules-based approach and often apply corrections to more formal language that may be used in documents, books, publications, journals, etc. In contrast, the text correction approach of the present disclosure is specific to correcting social media language (e.g., language used on Facebook), which is more informal and casual. Also, the present text correction approach targets specifically dyslexic users and common errors made by them which may be different from errors made by general population. It should be understood that the present disclosure is not limited to text correction for people with dyslexia and that the present disclosure is suitable/applicable to any person who have trouble with writing.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 2 illustrates an example of training data that may be used to train the machine-learning model for text correction.

DESCRIPTION OF EXAMPLE EMBODIMENTS

Figure 1:
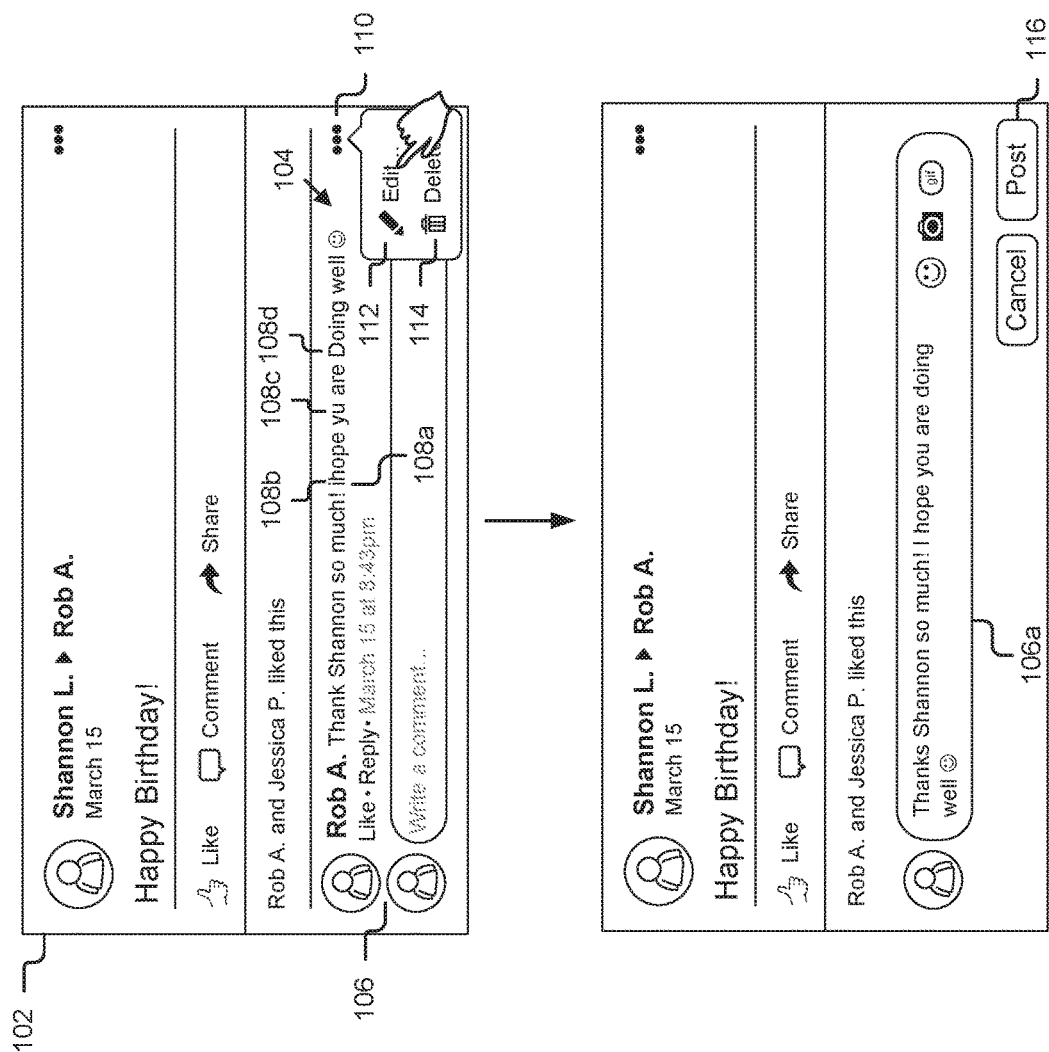
FIG. 1 illustrates an example of a user making changes to an existing post that may be used to train a machine-learning model for automatic text correction.

People suffering from dyslexia (also referred to herein as dyslexic people or users) often have a hard time interpreting, reading, and writing certain words. For example, they often make punctuation mistakes, forget to put appropriate commas in sentences, period marks, make capitalization errors, switches orders of certain letters in a word, etc. An example of a sentence written by a dyslexic user may be "The scientists psychologists, etc they Do not know what Is dylexia". As seen in this example, the sentence is poorly-written missing commas, periods, letters, and wrong capitalizations. A corrected version of this sentence would look something like this: "The scientists, psychologists, etc. do not know what is dyslexia." In particular embodiments, the social-networking system 760 (see FIG. 7) may provide an improved writing environment for these dyslexic users or more generally for people who have trouble with writing (e.g., may be due to their educational background or a particular language is not their first language). The social-networking system 760, in response to receiving a text from a user, may provide suggestions for text correction (e.g., grammar correction, spelling correction, punctuation correction, etc.) or in some instances, may automatically correct one or more errors in the text for the user since the dyslexic user may not be able to interpret or figure out the errors by themselves. In particular embodiments, the social-networking system 760 may perform the text correction based on a machine-learning approach. The machine-learning approach may include training a sequence-to-sequence model using a corpus of social-network data (e.g., posts) containing incorrect sentences/words and their corresponding corrected sentences/words so that the trained model may automatically predict where one or more errors are in the written text and correct or provide suggestions to a user. In particular embodiments, an incorrect text and its corresponding corrected version may be provided by the same user (who is making one or more errors at the first place), and the model may learn this user behavior over time to correct future texts. As an example, a user may submit a first post on an online social network, learn that the first post contains certain errors, and then submit a subsequent post in response to correct the errors in the first post. This may be used by the model to learn various types of errors and what their corresponding corrections should be (e.g., by comparing the first and second posts by the same user). The text correction approach discussed in this disclosure is different from existing correction applications in that the existing applications use a rules-based approach and often apply corrections to more formal language that may be used in documents, books, publications, journals, etc. In contrast, the text correction approach of the present disclosure is specific to correcting social media language (e.g., language used on Facebook), which is more informal and casual. Also, the present text correction approach targets specifically dyslexic users and common errors made by them which may be different from errors made by general population. It should be understood that the present disclosure is not limited to text correction for people with dyslexia and that the present disclosure is suitable/applicable to any person who have trouble with writing.

In particular embodiments, the machine-learning model of the social-networking system 160 for text correction may be trained in the following way. A large corpus of social-network data may be collected over a particular time period. As an example and not by way of limitation, the time period may be last two weeks, thirty days, ninety days, six months, one year, etc. The social-network data may include content objects posted by a plurality of users on the online social network over the particular time period. In particular embodiments, content objects may include social media posts posted by these plurality of users. These posts may contain various types of errors, such as for example, grammar errors, punctuation errors, wrong capitalization at places, wrong prepositions, etc. (see for example, FIGS. 3 and 4). Based on these errors, the social-networking system 760 may identify dyslexic users from the plurality of users. For instance, dyslexic users often tend to make some common word-level errors and/or sentence-level errors when writing a text. As an example and not by way of limitation, common word-level errors made by a dyslexic user may include words with swapping letters (e.g., "aminal" instead of "animal"), words with omitting letters (e.g., "dylexia" instead of "dyslexia"), confusing words with similar sounds (e.g., "rite" in place of "right", "their" in place of "there"), misusing small and common words (e.g., "no" in place of "on"), foreshortening words (e.g., "portion" in place of "proportion"), words omitting prefixes or suffixes, words with capitalization issues (e.g., "i" instead of "I", capitalization in middle of a word), etc. The sentence-level errors may include, for example and not by way of limitation, grammar errors (e.g., wrong verb tense), wrong prepositions (e.g., "with office hours" instead of "during office hours"), odd or no spacing between words (e.g., "alot" instead of "a lot"), sentence fragment issues (e.g., very long sentences), and wrong punctuations.

For each of the content objects (e.g., social media posts) containing one or more of word-level errors or sentence-level errors as discussed above, the social-networking system 760 may determine a corresponding corrected content object (e.g., content object with errors removed). In particular embodiments, a corrected content object may be provided by the same user who initially made one or more errors in that object. For instance, a user may submit a post on an online social network (e.g., Facebook) and may later realize that the post contains one or more errors as discussed herein. In order to correct these errors, the user may either delete that post and resubmits a new post with the errors removed, or may use an edit feature associated with the post to make the necessary edits to the existing post and then resubmits the existing post. This scenario is depicted, for example, in FIG. 1 (discussed below). In particular embodiments, the social-networking system 760 may maintain a history or log of these user edits/changes in a database. This history of user changes to posted objects may be feed into the machine-learning model for training purposes. For instance, the model may compare a first post submitted by a user and a second post submitted by the same user in response to the first post to learn the types of errors that were introduced in the first post and corrections that were performed by the user corresponding to those errors.

FIG. 1 illustrates an example of a user making changes to an existing post that may be used to train a machine-learning model for automatic text correction. As depicted, a friend of the user posted a "Happy Birthday" post 102 on user's newsfeed. The user replied to his friend by writing a text 104 in the comment section 106. The user later realized that he made some errors 108a-108d during typing. For example, as shown, the errors include a capitalization issue 108a ("i"), no spacing between words 108b ("ihope"), missing/omitted letter 108c ("yu"), and wrong capitalization in middle of sentence 108d ("Doing"). In order to correct these errors, the user may click on action button 110, which upon interacting shows an edit option 112 and a delete option 114. The edit option 112 may enable the user to make changes to the existing written text 104 whereas the delete option 114 may enable the user to delete the written text 104 and write a new one. As depicted, the user selected the edit option 112 by clicking or tapping on it. In response to the user selection, the comment box 106a for the written text 104 becomes active using which the user can make changes to the text and corrects the errors earlier made by him. Once the user is done making the desired changes, the user may resubmit his comment for posting by clicking on the action button 116. In particular embodiments, the social-networking system 760 may use such an editing scenario (as discussed in reference to FIG. 1) as well as other numerous editing performed by a plurality of other users to their existing posted content to train the machine-learning model discussed herein. Once the model is sufficiently trained, the social-networking system 760, using the trained model, may 1) automatically correct errors (e.g., errors 108a-108d) for the user, 2) provide suggestions for text correction once the user submits a post for posting on the online social network (e.g., as shown and discussed in reference to FIG. 3), 3) suggest corrections in real-time (e.g., as the user is typing, as shown and discussed in reference to FIG. 4), or 4) provide query suggestions to the user in response to an incorrect query term (e.g., as shown and discussed in reference to FIG. 5). It should be noted the social-networking system 760 is not limited to these use cases and other numerous use cases of text correction are also possible and within the scope of the present disclosure.

In some embodiments, the social-networking system 760 may train the machine-learning model based on corrections/annotations provided by one or more human annotators for content objects containing one or more of word-level errors or sentence-level errors. These human annotators may be experts or persons skilled in a particular language. For example, a human annotator may be a teacher of English language. The one or more human annotators may each manually evaluate the social-network data comprising the set of content objects collected over the particular time period and provide corrected/annotated versions for these objects. FIG. 2 illustrates an example of training data 200 that may be used to train the machine-learning model for text correction. As depicted, the training data 200 include some example social media posts containing errors (indicated in left column 202) and the corresponding corrected version (indicated in right column 204) for each of these posts. In some embodiments, the social media posts containing errors 202 are collected, by the social-networking system 760, from an online social network over a particular time period (as discussed above). For instance, the social-networking system 760 may identify dyslexic users on the online social network and determine posts containing word-level errors and/or sentence-level errors posted by them. The one or more human annotators may use these posts to evaluate and provide corresponding corrected posts with the errors removed, which may then be used by the social-networking system 760 to train the machine-learning model discussed herein. A human annotator may evaluate each of the posts 202 by analyzing the types of errors contained in that post and then categorizing the post into different labels. For instance, the human annotator may categorize the post into one of a "non-English" post, a "well-written" post, an "understandable but informal" post, or "a poorly-written" post. As an example, the human annotator may label a post written in French as "non-English", a post "It was a pleasure meeting you today. I hope to see you soon." as "well-written", a post "hey ya . . . wassup!! !" as "understandable but informal", and "i speak to my Professors with office hours today" as "poorly-written". In particular embodiments, only when the human annotator evaluates a certain post as "poorly-written", then he may provide a corresponding corrected post. In some embodiments, the human annotator at time of evaluating a post may include annotations (e.g., edits, comments, remarks, etc.) indicating a error status of the post (e.g., "non-English", "well-written", "understandable but informal", "poorly-written") as well as any corrections that they have to perform for correcting one or more errors in that post. In particular embodiments, example social media posts containing errors along with these annotations may be used by the social-networking system 760 to train the machine-learning model.

In some embodiments, when enough labeled or annotated data is not available to train the machine-learning model, an alternative approach may be used for text correction as well as for generating training data for the model. This alternate approach uses a two-step process for the text correction that may involve 1) translating a first language into a second language, and 2) translating the second language back to the first language. For example, a translator module/component of the social-networking system 760 may translate the English language into a foreign language, such as French, and then translate the French language back to the original English language. The advantage of this two-step translation process is that it preserves the semantic meaning of the sentence while correcting any syntax and/or grammatical mistakes in the sentence. The original language before the translation process (e.g., dyslexic English) and the language after the translation process (e.g., corrected English) may be used as training data for training the machine-learning model discussed herein.

In particular embodiments, the machine-learning model for text correction may be a sequence-to-sequence model, which is, generally, a model that takes in a sequence of inputs, looks at each element of the sequence, and tries to predict the next element of the sequence. This model may be used for tasks, such as machine translation, speech recognition, and text summarization. The sequence-to-sequence model is often represented by the equation "$Y_t = f(Y_{t-1})$" where $Y_t$ is the sequence element at time t, $Y_{t-1}$ is the sequence element at the prior time step, and $f$ is a function mapping the previous element of the sequence to the next element of the sequence. The same equation may be applied to the text correction approach of the present disclosure, where $Y_{t-1}$ may be a poorly-written sentence or dyslexic English sentence, $Y_t$ may be the corrected sentence, and $f$ represents the function mapping the dyslexic English to correct English based on the training discussed herein.

In particular embodiments, the machine-learning model (e.g., the sequence-to-sequence model) may include two recurrent neural networks: an encoder component and a decoder component. The encoder may be configured to transform an input sentence or phrase (e.g., text string) received from a user (e.g., dyslexic user) into a vector representation. For instance, given a sentence comprising a set of words, the encoder may process each of the words to generate word vectors w1 . . . wn, each of dimension d, and then combine all the word vectors into a single sentence vector (e.g., by taking an average of the word vectors). In some embodiments, the encoder may parse the input sentence into n-grams (e.g., unigrams, bigrams, trigrams), generate the word vectors for these n-grams, and then combine the word vectors to compute a sentence vector. In some embodiments, standard encoding techniques such as bag-of-words model or term frequency-inverse document frequency (TF-IDF) analysis may be used for generating a vector representation of a sentence. In particular embodiments, encoding a sentence into a vector representation is advantageous as it preserves the semantic meaning of the sentence. The decoder may be configured to generate an output from the vector representation of the input sentence. For example, the output may be a corrected English sentence with one or more errors removed that were introduced by a dyslexic user. In particular embodiments, the decoder may be built on top of a language model, which may help determine the likely word-sequence or structure of a sentence. The language model may be a machine-learning model that may be trained, according to particular embodiments, using a corpus of social media posts. For example, the language model may be trained using this corpus to learn the writing style and informal use of the language when writing social media posts. As an example, the language model using this corpus learns that use of emojis, exclamation marks, ellipsis (". . ."), etc. are quite common and often used by people within a social context and therefore these should be preserved while correcting a sentence. The decoder may leverage the knowledge from this language model to determine which words to correct and which words to preserve while correcting a sentence. As an example and not by way of limitation, the sentence "i am Lovingit !!! ☺" may be corrected to "I am loving it !!! ☺" while keeping the exclamation marks and emoji preserved, as indicated by the language model based on its learning of the social media language. As another example, the decoder may not found any error in the sentence "hey there, wassup . . . ", as the language model may indicate that this is a normal way of starting a casual conversation and that the user associated with this sentence intents to write it in this way.

In particular embodiments, the social-networking system 760, based on the trained machine-learning model, may provide suggestions for text correction in the following way. In response to receiving a text from a user for posting on an online social network, a front-end correction engine (built on top of the trained sequence-to-sequence model) of the social-networking system 760 may first rate the overall quality of the text by categorizing the text into one of a "non-English" text, a "well-written" text, an "understandable but informal" text, and a "poorly-written" text. In particular embodiments, the model may be trained to automatically classify a text into an appropriate category based on an initial manual categorization of a set of example texts performed by one or more human annotators (as discussed above in reference to FIG. 2). If the text is categorized as any one of the "non-English", "well-written", or "understandable but informal", the correction engine of the social-networking system 760 may not perform any correction on the text. As an example and not by way of limitation, the correction engine may categorize the sentence "Entertain me . . . " into "well-written" and may therefore not perform any correction on this sentence. As another example, the correction engine may categorize "wassup !!!" as "understandable but informal" and may therefore not perform any correction on it. In case, the correction engine determines that the user-written text is a "poorly-written" text, the correction engine may provide suggestions for text correction, as discussed in further detail below in reference to FIGS. 3 and 4.

Figure 3:
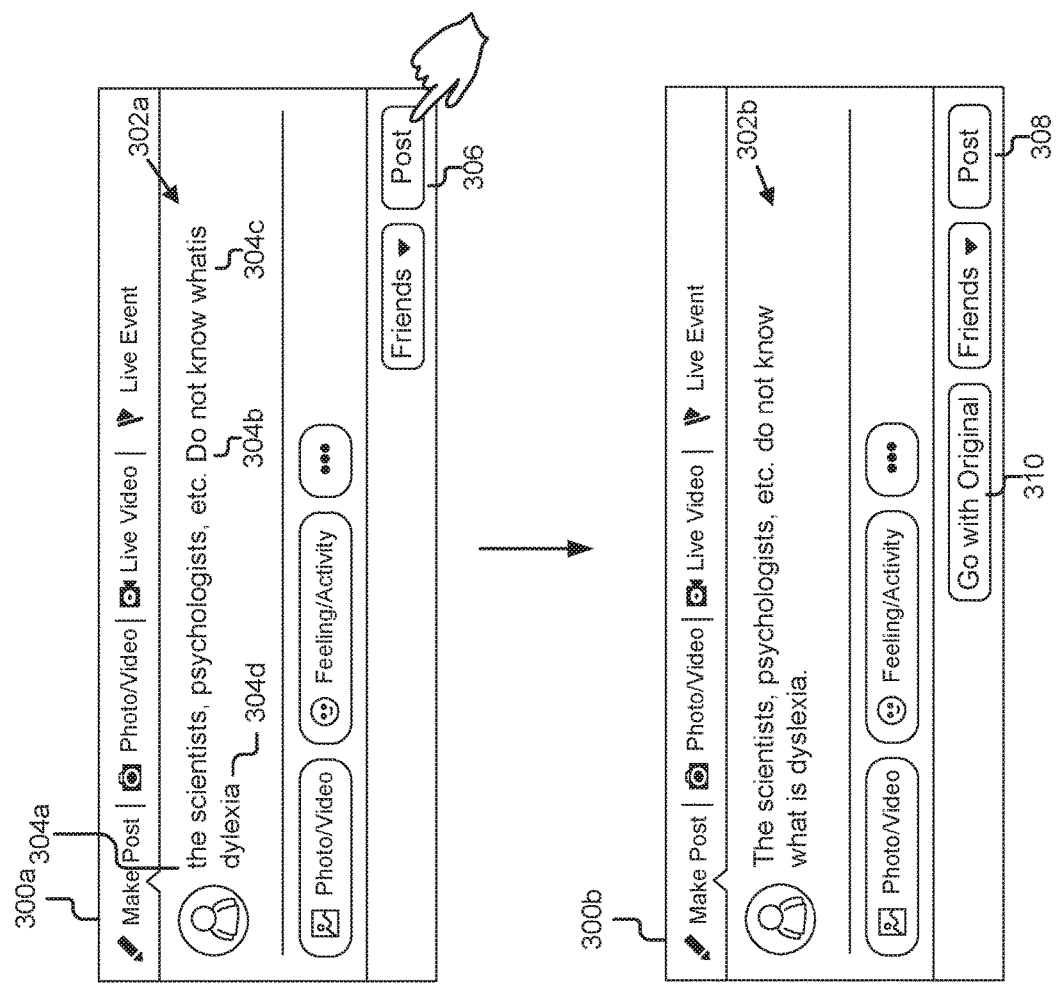
FIG. 3 illustrates an example of text correction according to an embodiment of the present invention.

FIG. 3 illustrates an example of text correction according to an embodiment of the present invention. A user may compose a post 300a comprising a text string 302a. As depicted, the text string 302a includes errors 304a-304d. The user may post the written text string 302a on an online social network (e.g., Facebook) by clicking on an action button 306. Responsive to the user submitting the post for posting, the correction engine of the social-networking system 760 may analyze the post 300a and categorizes it into a "poorly-written" post since the text string 302a contains errors 304a-304d relating to dyslexic English or that are commonly found to be performed by someone with dyslexia. For example, the text string 302a contains capitalization errors/issues (indicated by reference numerals 304a and 304b), incorrect spacing between words (indicated by reference numeral 304c), and a word with omitted letter (indicated by reference numeral 304d) that are often found to be made by a dyslexic user. In response to determining the post 300a as a "poorly-written" post, the correction engine may generate a second post 300b comprising a corrected text string 302b and present it on the client system 730 associated with the user. The second post 300b may be provided as a suggestion to the user and it may be up to the user to decide whether he wants to proceed with the suggested post 300b (e.g., by clicking on the action button 308) or continue with the original post 300a (e.g., by clicking on action button 310).

Figure 4:
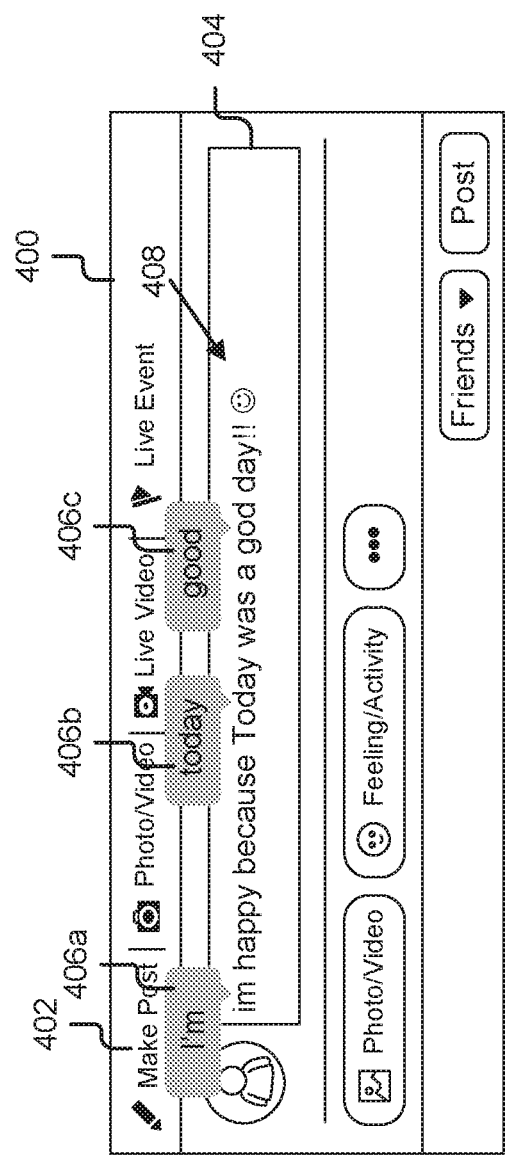
FIG. 4 illustrates another example of text correction where suggestions for text correction may be provided in real-time.

In some embodiments, the correction engine of the social-networking system 760 may provide suggestions for text correction in real-time. FIG. 4 illustrates another example of text correction where suggestions for text correction may be provided in real-time. As depicted, a user may compose a post 400 by clicking on action button 402 and typing in the text box 404. As the user is typing, one or more suggestions 406a-406c for correcting one or more errors introduced in the written text 408 may be displayed in real-time on the client system 730 associated with the user. For example, the correction engine may suggest "I'm" as the user types "im", "today" as the user types "Today", and "good" as the user types "god". Again, as discussed above in reference to FIG. 3, it may be up to the user to accept these suggestions or proceed with the original written text 408. The user may accept one or more of these suggestions 406a-406c by interacting (e.g., clicking, tapping) on them. For example, the user may accept the suggestion 406a by clicking or tapping on it. In response to receiving the user acceptance, the correction engine may replace the user-typed word (e.g., "im") with the system's generated correction (e.g., "I'm").

Figure 5:
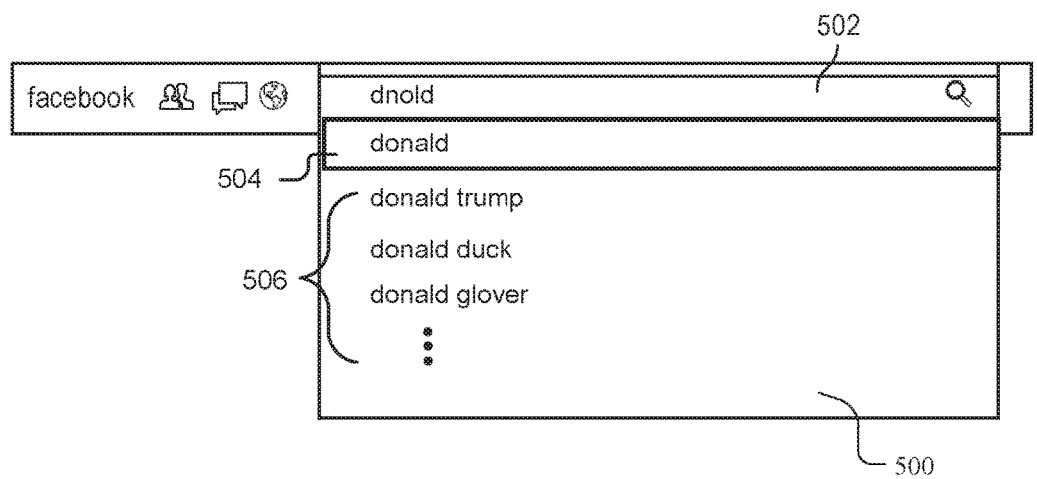
FIG. 5 illustrates an example of query suggestions that may be provided in response to a query term entered incorrectly by a dyslexic user.

In particular embodiments, the social-networking system 760, based on the trained machine-learning model, may also provide query suggestions in response to a search query or query term received from a dyslexic user. FIG. 5 illustrates an example of query suggestions 500 that may be provided in response to a query term 502 entered incorrectly by a dyslexic user. For example, the user may intent to query for "donald" but due to his dyslexic condition, he instead entered "dnold". Upon receiving the incorrect query term 502, the correction engine of the social-networking system 760 may present query suggestions 500 comprising a suggested query term 504 for the incorrect query term 502 and related terms 506. The related terms 506 may be terms that are often found to be associated with the suggested query term 504. For example, "donald trump", "donald duck", "donald glover" are often recommended by a search engine when a user searches for "donald". In some embodiments, these related terms may be appended to the suggested query term 504 by a typeahead process (discussed in detail later below) of the social-networking system 760.

Figure 6:
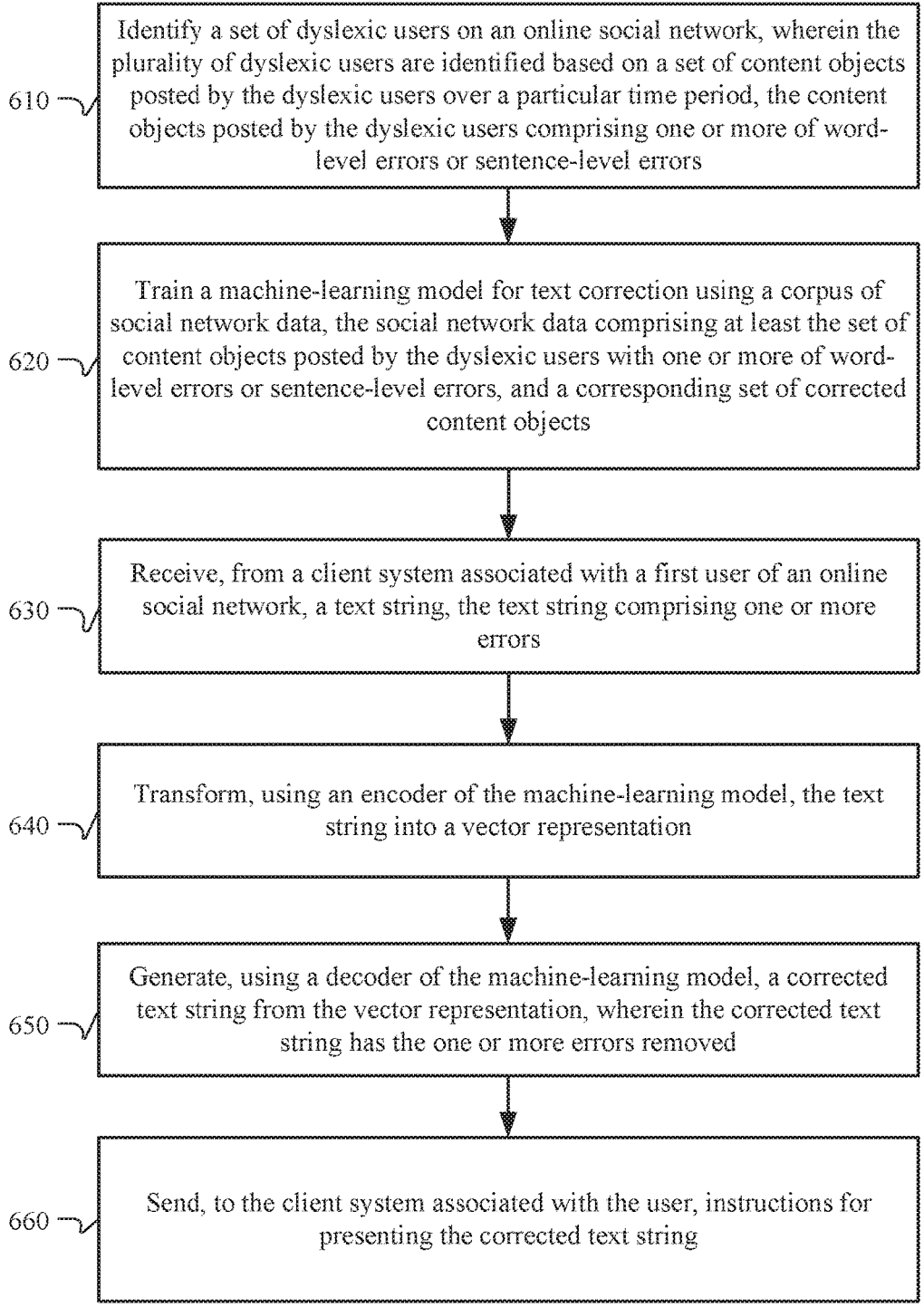
FIG. 6 is a flowchart of an example method for generating a text correction for an example text string based on training a machine-learning model.

FIG. 6 is a flowchart of an example method 600 for generating a text correction for an example text string based on training a machine-learning model. The method may begin at step 610, where the social-networking system 760 may identify a plurality of dyslexic users on an online social network. The social-networking system 760 may identify the plurality of dyslexic users based on a set of content objects posted by these users over a particular time period (e.g., last two weeks, thirty days, ninety days, six months, one year, etc.). In particular embodiments, the set of content objects posted by the dyslexic users may include social media posts. The content objects posted by the dyslexic users may include one or more word-level errors or sentence-level errors as discussed elsewhere herein. The word-level errors may include, for example, one or more of words with swapping letters, words with omitting letters, foreshortening words, words omitting prefixes or suffixes, or words with capitalization issues. The sentence-level errors may include, for example, one or more of grammar errors, wrong prepositions, odd or no spacing between words, sentence fragment issues, or wrong punctuations. At step 620, the social-networking system 760 may train a machine-learning model for text correction using a corpus of social-network data. The social-network data may include at least the content objects posted by the dyslexic users with one or more of word-level errors or sentence-level errors, and a corresponding set of corrected content objects. In some embodiments, a content object, posted by a dyslexic user, with one or more of word-level errors or sentence-level errors may include a first social media post, and a corresponding corrected content object may include a second social media post submitted by the same user in order to correct the first social media post. In some embodiments, the set of content objects containing errors and a corresponding set of corrected content objects may be provided by one or more human annotators as discussed in reference to at least FIG. 2. For instance, a first set of training data (e.g., content objects) may be provided by a human annotator (e.g., person skilled or proficient in a particular language) where the human annotator intentionally introduces some errors into words or sentences and provides their corresponding annotated versions.

At step 630, the social-networking system 760 may receive, from a client system 730 associated with a first user (e.g., a dyslexic user) of an online social network, a text string. The text string may include one or more errors. In some embodiments, the text string may be parsed into one or more n-grams, where the one or more n-grams may include the one or more errors. The one or more n-grams may be one or more of unigrams, bigrams, or trigrams. In some embodiments, responsive to receiving the text string, the social-networking system 760 may analyze the text string and categorize into one of a "non-English" text, a "well-written" text, an "understandable but informal" text, or a "poorly written" text, as discussed elsewhere herein. In particular embodiments, subsequent steps 640-660 of the method 600 may be performed in response to the social-networking system 760 determining that the text string is categorized into the "poorly-written" text. At step 640, the social-networking system 760 may transform, using an encoder of the machine-learning model, the text string into a vector representation. In particular embodiments, transforming the text string into the vector representation may preserve the semantic meaning of the text string. At step 650, the social-networking system 760 may generate, using a decoder of the machine-learning model, a corrected text string from the vector representation. The corrected text string may have the one or more errors removed. At step 660, the social-networking system 760 may send, to the client system 730 associated with the first user, instructions for presenting the corrected text string. In some embodiments, the corrected text string may be provided as a suggestion in response to receiving an input from the first user to post the original text string (as discussed in reference to FIG. 3). It is up to the user then to either post the corrected text string or the original text string. In some embodiments, suggestions for correcting the one or more errors in the text string may be generated and provided in real-time (as discussed in reference to FIG. 4). Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for generating a text correction for an example text string based on training a machine-learning model including the particular steps of the method of FIG. 6, this disclosure contemplates any suitable method for generating a text correction for an example text string based on training a machine-learning model, including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

System Overview

Figure 7:
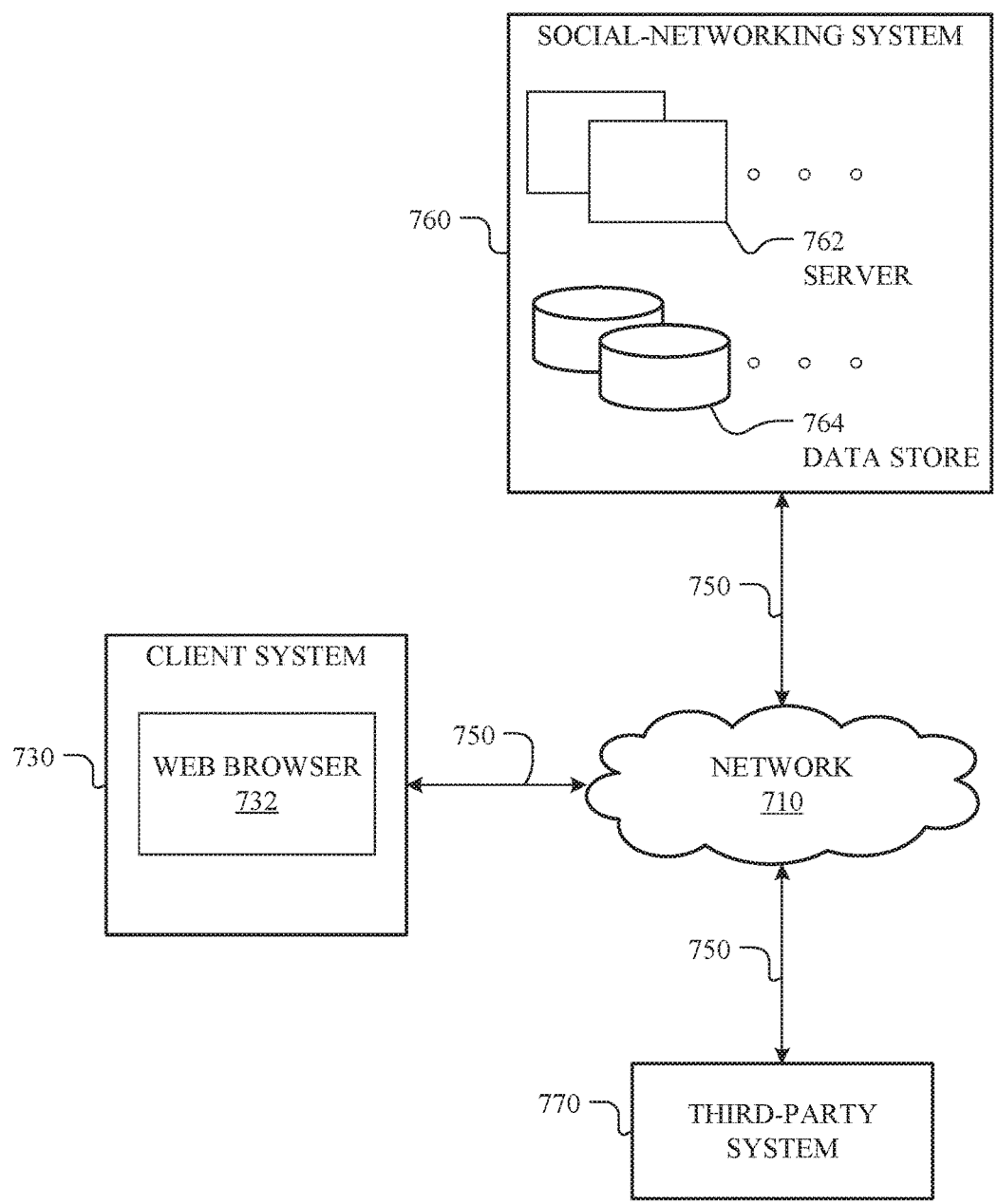
FIG. 7 illustrates an example network environment associated with a social-networking system.

FIG. 7 illustrates an example network environment 700 associated with a social-networking system. Network environment 700 includes a client system 730, a social-networking system 760, and a third-party system 770 connected to each other by a network 710. Although FIG. 7 illustrates a particular arrangement of a client system 730, a social-networking system 760, a third-party system 770, and a network 710, this disclosure contemplates any suitable arrangement of a client system 730, a social-networking system 760, a third-party system 770, and a network 710. As an example and not by way of limitation, two or more of a client system 730, a social-networking system 760, and a third-party system 770 may be connected to each other directly, bypassing a network 710. As another example, two or more of a client system 730, a social-networking system 760, and a third-party system 770 may be physically or logically co-located with each other in whole or in part. Moreover, although FIG. 7 illustrates a particular number of client systems 730, social-networking systems 760, third-party systems 770, and networks 710, this disclosure contemplates any suitable number of client systems 730, social-networking systems 760, third-party systems 770, and networks 710. As an example and not by way of limitation, network environment 700 may include multiple client systems 730, social-networking systems 760, third-party systems 770, and networks 710.

This disclosure contemplates any suitable network 710. As an example and not by way of limitation, one or more portions of a network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 710 may include one or more networks 710.

Links 750 may connect a client system 730, a social-networking system 760, and a third-party system 770 to a communication network 710 or to each other. This disclosure contemplates any suitable links 750. In particular embodiments, one or more links 750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout a network environment 700. One or more first links 750 may differ in one or more respects from one or more second links 750.

In particular embodiments, a client system 730 may be an electronic device including hardware, software, or embedded logic components or a combination of two or more such components and capable of carrying out the appropriate functionalities implemented or supported by a client system 730. As an example and not by way of limitation, a client system 730 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 730. A client system 730 may enable a network user at a client system 730 to access a network 710. A client system 730 may enable its user to communicate with other users at other client systems 730.

In particular embodiments, a client system 730 may include a web browser 732, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 730 may enter a Uniform Resource Locator (URL) or other address directing a web browser 732 to a particular server (such as server 762, or a server associated with a third-party system 770), and the web browser 732 may generate a Hyper Text Transfer Protocol (HTTP) request and communicate the HTTP request to server. The server may accept the HTTP request and communicate to a client system 730 one or more Hyper Text Markup Language (HTML) files responsive to the HTTP request. The client system 730 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 760 may be a network-addressable computing system that can host an online social network. The social-networking system 760 may generate, store, receive, and send social-networking data, such as, for example, user-profile data, concept-profile data, social-graph information, or other suitable data related to the online social network. The social-networking system 760 may be accessed by the other components of network environment 700 either directly or via a network 710. As an example and not by way of limitation, a client system 730 may access the social-networking system 760 using a web browser 732, or a native application associated with the social-networking system 760 (e.g., a mobile social-networking application, a messaging application, another suitable application, or any combination thereof) either directly or via a network 710. In particular embodiments, the social-networking system 760 may include one or more servers 762. Each server 762 may be a unitary server or a distributed server spanning multiple computers or multiple datacenters. Servers 762 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 762 may include hardware, software, or embedded logic components or a combination of two or more such components for carrying out the appropriate functionalities implemented or supported by server 762. In particular embodiments, the social-networking system 760 may include one or more data stores 764. Data stores 764 may be used to store various types of information. In particular embodiments, the information stored in data stores 764 may be organized according to specific data structures. In particular embodiments, each data store 764 may be a relational, columnar, correlation, or other suitable database. Although this disclosure describes or illustrates particular types of databases, this disclosure contemplates any suitable types of databases. Particular embodiments may provide interfaces that enable a client system 730, a social-networking system 760, or a third-party system 770 to manage, retrieve, modify, add, or delete, the information stored in data store 764.

In particular embodiments, the social-networking system 760 may store one or more social graphs in one or more data stores 764. In particular embodiments, a social graph may include multiple nodes—which may include multiple user nodes (each corresponding to a particular user) or multiple concept nodes (each corresponding to a particular concept)—and multiple edges connecting the nodes. The social-networking system 760 may provide users of the online social network the ability to communicate and interact with other users. In particular embodiments, users may join the online social network via the social-networking system 760 and then add connections (e.g., relationships) to a number of other users of the social-networking system 760 whom they want to be connected to. Herein, the term "friend" may refer to any other user of the social-networking system 760 with whom a user has formed a connection, association, or relationship via the social-networking system 760.

In particular embodiments, the social-networking system 760 may provide users with the ability to take actions on various types of items or objects, supported by the social-networking system 760. As an example and not by way of limitation, the items and objects may include groups or social networks to which users of the social-networking system 760 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 760 or by an external system of a third-party system 770, which is separate from the social-networking system 760 and coupled to the social-networking system 760 via a network 710.

In particular embodiments, the social-networking system 760 may be capable of linking a variety of entities. As an example and not by way of limitation, the social-networking system 760 may enable users to interact with each other as well as receive content from third-party systems 770 or other entities, or to allow users to interact with these entities through an application programming interfaces (API) or other communication channels.

In particular embodiments, a third-party system 770 may include one or more types of servers, one or more data stores, one or more interfaces, including but not limited to APIs, one or more web services, one or more content sources, one or more networks, or any other suitable components, e.g., that servers may communicate with. A third-party system 770 may be operated by a different entity from an entity operating the social-networking system 760. In particular embodiments, however, the social-networking system 760 and third-party systems 770 may operate in conjunction with each other to provide social-networking services to users of the social-networking system 760 or third-party systems 770. In this sense, the social-networking system 760 may provide a platform, or backbone, which other systems, such as third-party systems 770, may use to provide social-networking services and functionality to users across the Internet.

In particular embodiments, a third-party system 770 may include a third-party content object provider. A third-party content object provider may include one or more sources of content objects, which may be communicated to a client system 730. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 760 also includes user-generated content objects, which may enhance a user's interactions with the social-networking system 760. User-generated content may include anything a user can add, upload, send, or "post" to the social-networking system 760. As an example and not by way of limitation, a user communicates posts to the social-networking system 760 from a client system 730. Posts may include data such as status updates or other textual data, location information, photos, videos, links, music or other similar data or media. Content may also be added to the social-networking system 760 by a third-party through a "communication channel," such as a newsfeed or stream.

In particular embodiments, the social-networking system 760 may include a variety of servers, sub-systems, programs, modules, logs, and data stores. In particular embodiments, the social-networking system 760 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 760 may also include suitable components such as network interfaces, security mechanisms, load balancers, failover servers, management-and-network-operations consoles, other suitable components, or any suitable combination thereof. In particular embodiments, the social-networking system 760 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 760 to one or more client systems 730 or one or more third-party systems 770 via a network 710. The web server may include a mail server or other messaging functionality for receiving and routing messages between the social-networking system 760 and one or more client systems 730. An API-request server may allow a third-party system 770 to access information from the social-networking system 760 by calling one or more APIs. An action logger may be used to receive communications from a web server about a user's actions on or off the social-networking system 760. In conjunction with the action log, a third-party-content-object log may be maintained of user exposures to third-party-content objects. A notification controller may provide information regarding content objects to a client system 730. Information may be pushed to a client system 730 as notifications, or information may be pulled from a client system 730 responsive to a request received from a client system 730. Authorization servers may be used to enforce one or more privacy settings of the users of the social-networking system 760. A privacy setting of a user determines how particular information associated with a user can be shared. The authorization server may allow users to opt in to or opt out of having their actions logged by the social-networking system 760 or shared with other systems (e.g., a third-party system 770), such as, for example, by setting appropriate privacy settings. Third-party-content-object stores may be used to store content objects received from third parties, such as a third-party system 770. Location stores may be used for storing location information received from client systems 730 associated with users. Advertisement-pricing modules may combine social information, the current time, location information, or other suitable information to provide relevant advertisements, in the form of notifications, to a user.

Social Graphs

Figure 8:
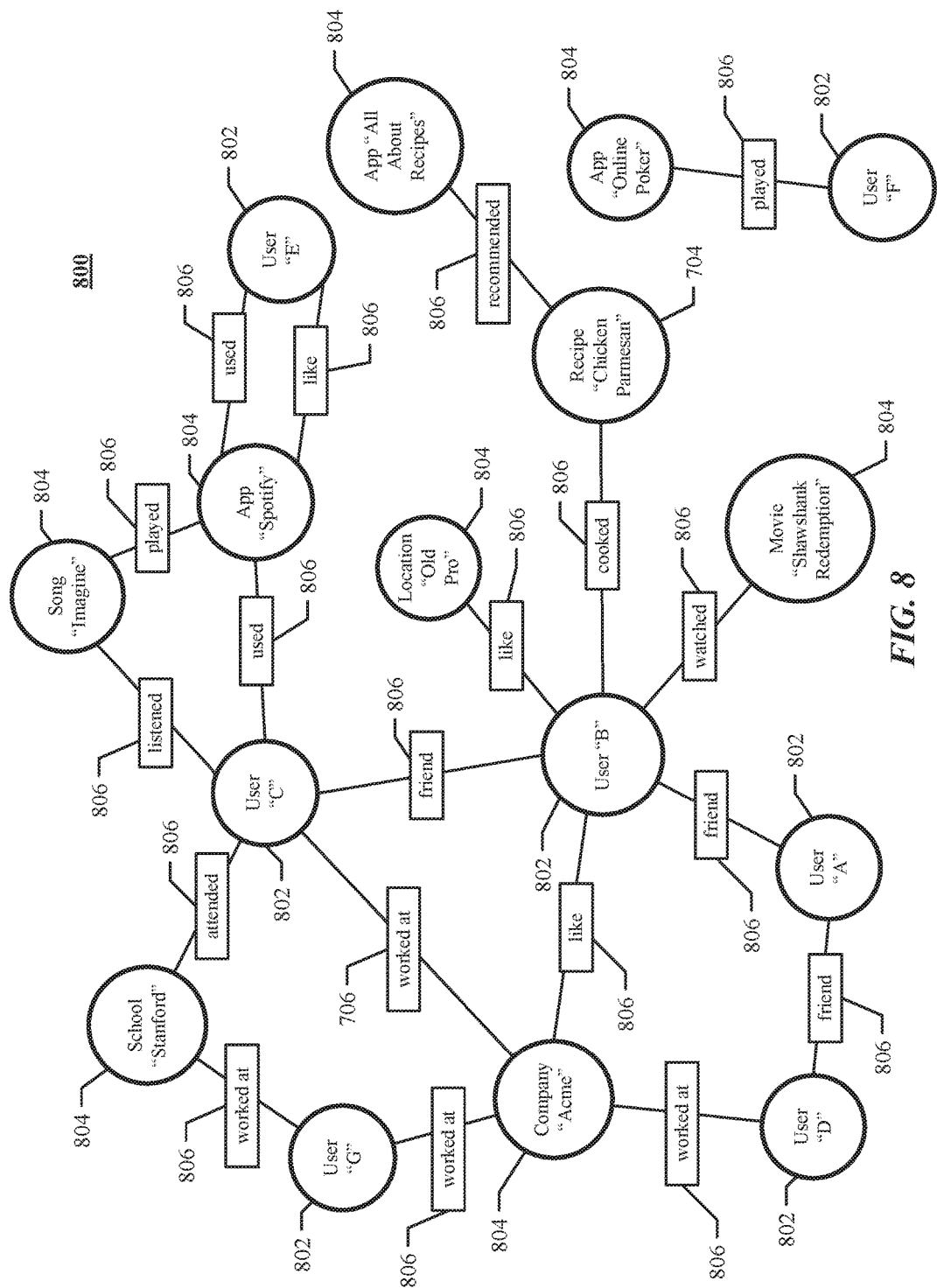
FIG. 8 illustrates an example social graph.

FIG. 8 illustrates an example social graph 800. In particular embodiments, the social-networking system 760 may store one or more social graphs 800 in one or more data stores. In particular embodiments, the social graph 800 may include multiple nodes—which may include multiple user nodes 802 or multiple concept nodes 804—and multiple edges 806 connecting the nodes. The example social graph 800 illustrated in FIG. 8 is shown, for didactic purposes, in a two-dimensional visual map representation. In particular embodiments, a social-networking system 760, a client system 730, or a third-party system 770 may access the social graph 800 and related social-graph information for suitable applications. The nodes and edges of the social graph 800 may be stored as data objects, for example, in a data store (such as a social-graph database). Such a data store may include one or more searchable or queryable indexes of nodes or edges of the social graph 800.

In particular embodiments, a user node 802 may correspond to a user of the social-networking system 760. As an example and not by way of limitation, a user may be an individual (human user), an entity (e.g., an enterprise, business, or third-party application), or a group (e.g., of individuals or entities) that interacts or communicates with or over the social-networking system 760. In particular embodiments, when a user registers for an account with the social-networking system 760, the social-networking system 760 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with the social-networking system 760. In particular embodiments, a user node 802 may be associated with information provided by a user or information gathered by various systems, including the social-networking system 760. As an example and not by way of limitation, a user may provide his or her name, profile picture, contact information, birth date, sex, marital status, family status, employment, education background, preferences, interests, or other demographic information. In particular embodiments, a user node 802 may be associated with one or more data objects corresponding to information associated with a user. In particular embodiments, a user node 802 may correspond to one or more web interfaces.

In particular embodiments, a concept node 804 may correspond to a concept. As an example and not by way of limitation, a concept may correspond to a place (such as, for example, a movie theater, restaurant, landmark, or city); a website (such as, for example, a website associated with the social-networking system 760 or a third-party website associated with a web-application server); an entity (such as, for example, a person, business, group, sports team, or celebrity); a resource (such as, for example, an audio file, video file, digital photo, text file, structured document, or application) which may be located within the social-networking system 760 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 804 may be associated with information of a concept provided by a user or information gathered by various systems, including the social-networking system 760. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more web interfaces.

In particular embodiments, a node in the social graph 800 may represent or be represented by a web interface (which may be referred to as a "profile interface"). Profile interfaces may be hosted by or accessible to the social-networking system 760. Profile interfaces may also be hosted on third-party websites associated with a third-party system 770. As an example and not by way of limitation, a profile interface corresponding to a particular external web interface may be the particular external web interface and the profile interface may correspond to a particular concept node 804. Profile interfaces may be viewable by all or a selected subset of other users. As an example and not by way of limitation, a user node 802 may have a corresponding user-profile interface in which the corresponding user may add content, make declarations, or otherwise express himself or herself. As another example and not by way of limitation, a concept node 804 may have a corresponding concept-profile interface in which one or more users may add content, make declarations, or express themselves, particularly in relation to the concept corresponding to concept node 804.

In particular embodiments, a concept node 804 may represent a third-party web interface or resource hosted by a third-party system 770. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 730 to send to the social-networking system 760 a message indicating the user's action. In response to the message, the social-networking system 760 may create an edge (e.g., a check-in-type edge) between a user node 802 corresponding to the user and a concept node 804 corresponding to the third-party web interface or resource and store edge 806 in one or more data stores.

In particular embodiments, a pair of nodes in the social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, the social-networking system 760 may send a "friend request" to the second user. If the second user confirms the "friend request," the social-networking system 760 may create an edge 806 connecting the first user's user node 802 to the second user's user node 802 in the social graph 800 and store edge 806 as social-graph information in one or more of data stores 764. In the example of FIG. 8, the social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 800 by one or more edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to an edge type or subtype. A concept-profile interface corresponding to a concept node 804 may include, for example, a selectable "check in" icon (such as, for example, a clickable "check in" icon) or a selectable "add to favorites" icon. Similarly, after a user clicks these icons, the social-networking system 760 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 760 may create a "listened" edge 806 and a "used" edge (as illustrated in FIG. 8) between user nodes 802 corresponding to the user and concept nodes 804 corresponding to the song and application to indicate that the user listened to the song and used the application. Moreover, the social-networking system 760 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "SPOTIFY").

In particular embodiments, the social-networking system 760 may create an edge 806 between a user node 802 and a concept node 804 in the social graph 800. As an example and not by way of limitation, a user viewing a concept-profile interface (such as, for example, by using a web browser or a special-purpose application hosted by the user's client system 730) may indicate that he or she likes the concept represented by the concept node 804 by clicking or selecting a "Like" icon, which may cause the user's client system 730 to send to the social-networking system 760 a message indicating the user's liking of the concept associated with the concept-profile interface. In response to the message, the social-networking system 760 may create an edge 806 between user node 802 associated with the user and concept node 804, as illustrated by "like" edge 806 between the user and concept node 804. In particular embodiments, the social-networking system 760 may store an edge 806 in one or more data stores. In particular embodiments, an edge 806 may be automatically formed by the social-networking system 760 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

Search Queries on Online Social Networks

In particular embodiments, the social-networking system 760 may receive, from a client system of a user of an online social network, a query inputted by the user. The user may submit the query to the social-networking system 760 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 760 that matches the text query. The social-networking system 760 may then search a data store 764 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 802, concept nodes 804, edges 806), profile interfaces, external web interfaces, or any combination thereof. The social-networking system 760 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 760 may then send the search-results interface to the web browser 732 on the user's client system 730. The user may then click on the URL links or otherwise select the content from the search-results interface to access the content from the social-networking system 760 or from an external system (such as, for example, a third-party system 770), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 770, the internet or World Wide Web, or other suitable sources. Although this disclosure describes querying the social-networking system 760 in a particular manner, this disclosure contemplates querying the social-networking system 760 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 802, concept nodes 804, or edges 806) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 760. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 800. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 760. In particular embodiments, the typeahead process may use one or more matching algorithms to attempt to identify matching social-graph elements. In particular embodiments, when a match or matches are found, the typeahead process may send a response to the user's client system 730 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 802 or concept nodes 804, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 802, concept nodes 804, or edges 806 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 802, concept nodes 804, edges 806) having respective names, types, categories, or other identifiers matching the entered text. The typeahead process may use one or more matching algorithms to attempt to identify matching nodes or edges. When a match or matches are found, the typeahead process may send a response to the user's client system 730 that may include, for example, the names (name strings) of the matching nodes as well as, potentially, other metadata associated with the matching nodes. The typeahead process may then display a drop-down menu that displays names of matching existing profile interfaces and respective user nodes 802 or concept nodes 804, and displays names of matching edges 806 that may connect to the matching user nodes 802 or concept nodes 804, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 760 of the user's confirmation of a query containing the matching social-graph elements. In response to the request sent, the social-networking system 760 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 760 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 760 may access a social graph 800 and then parse the text query to identify the social-graph elements that corresponded to ambiguous n-grams from the text query. The social-networking system 760 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 760 may generate a structured query "Friends of Stephanie," where "Friends" and "Stephanie" in the structured query are references corresponding to particular social-graph elements. The reference to "Stephanie" would correspond to a particular user node 802 (where the social-networking system 760 has parsed the n-gram "my girlfriend" to correspond with a user node 802 for the user "Stephanie"), while the reference to "Friends" would correspond to friend-type edges 806 connecting that user node 802 to other user nodes 802 (i.e., edges 806 connecting to "Stephanie's" first-degree friends). When executing this structured query, the social-networking system 760 may identify one or more user nodes 802 connected by friend-type edges 806 to the user node 802 corresponding to "Stephanie". As another example and not by way of limitation, in response to the text query, "friends who work at facebook," the social-networking system 760 may generate a structured query "My friends who work at Facebook," where "my friends," "work at," and "Facebook" in the structured query are references corresponding to particular social-graph elements as described previously (i.e., a friend-type edge 806, a work-at-type edge 806, and concept node 804 corresponding to the company "Facebook"). By providing suggested structured queries in response to a user's text query, the social-networking system 760 may provide a powerful way for users of the online social network to search for elements represented in the social graph 800 based on their social-graph attributes and their relation to various social-graph elements. Structured queries may allow a querying user to search for content that is connected to particular users or concepts in the social graph 800 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 760 may provide customized keyword completion suggestions to a querying user as the user is inputting a text string into a query field. Keyword completion suggestions may be provided to the user in a non-structured format. In order to generate a keyword completion suggestion, the social-networking system 760 may access multiple sources within the social-networking system 760 to generate keyword completion suggestions, score the keyword completion suggestions from the multiple sources, and then return the keyword completion suggestions to the user. As an example and not by way of limitation, if a user types the query "friends stan," then the social-networking system 760 may suggest, for example, "friends stanford," "friends stanford university," "friends stanley," "friends stanley cooper," "friends stanley kubrick," "friends stanley cup," and "friends stanlonski." In this example, the social-networking system 760 is suggesting the keywords which are modifications of the ambiguous n-gram "stan," where the suggestions may be generated from a variety of keyword generators. The social-networking system 760 may have selected the keyword completion suggestions because the user is connected in some way to the suggestions. As an example and not by way of limitation, the querying user may be connected within the social graph 800 to the concept node 804 corresponding to Stanford University, for example by like- or attended-type edges 806. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr.

2014, U.S. patent application Ser. No. 14/470,607, filed 27 Aug. 2014, and U.S. patent application Ser. No. 14/561,418, filed 5 Dec. 2014, each of which is incorporated by reference.

Systems and Methods

Figure 9:
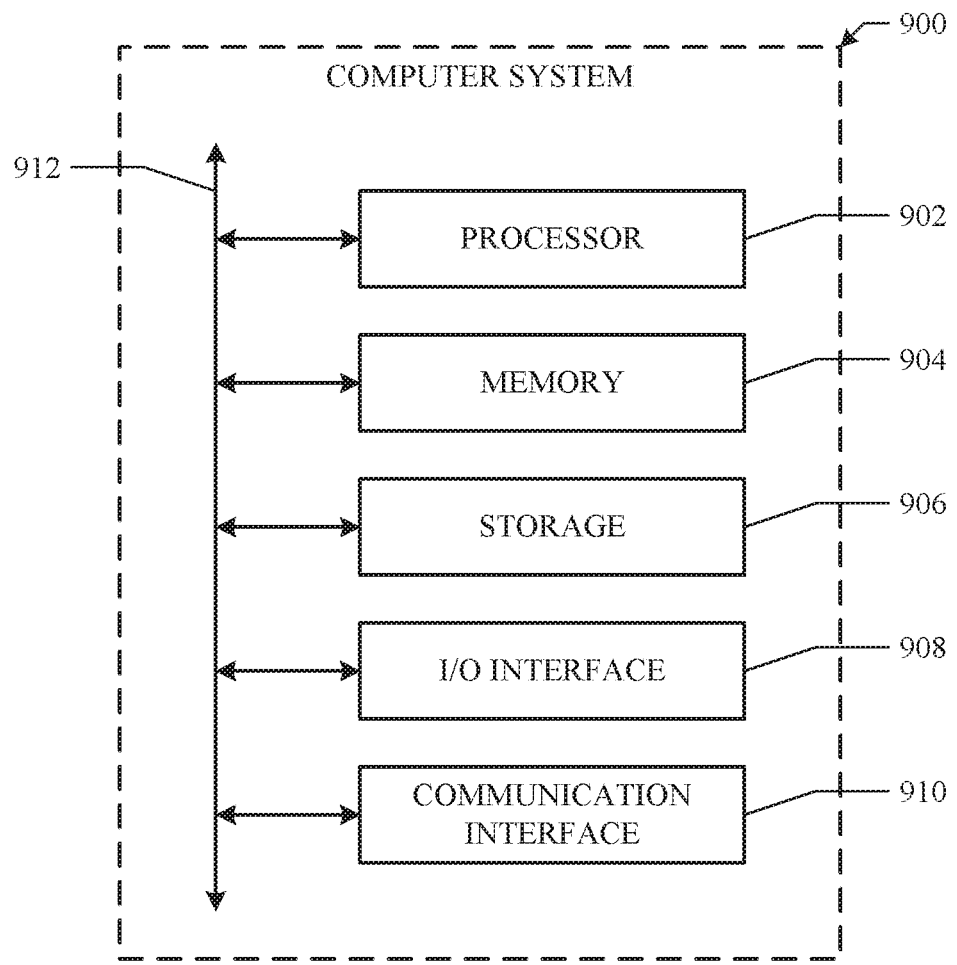
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these.

Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/0 interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
   identifying a plurality of dyslexic users on an online social network, wherein the plurality of dyslexic users are identified based on a set of content objects posted by the dyslexic users over a particular time period, the content objects posted by the dyslexic users comprising one or more of word-level errors or sentence-level errors;
   training a machine-learning model for text correction using a corpus of social network data, the social network data comprising at least the set of content objects posted by the dyslexic users with one or more of word-level errors or sentence-level errors, and a corresponding set of corrected content objects that are posted to replace the posted set of content objects;
   receiving, from a client system associated with a first user of an online social network, a text string, the text string comprising one or more errors;
   transforming, using an encoder of the machine-learning model, the text string into a vector representation;
   generating, using a decoder of the machine-learning model, a corrected text string from the vector representation, wherein the corrected text string has the one or more errors removed; and
   sending, to the client system associated with the first user, instructions for presenting the corrected text string.

2. The method of claim 1, wherein the set of content objects posted by the dyslexic users comprises social media posts.

3. The method of claim 2, wherein:
   a content object, posted by a dyslexic user from the plurality of dyslexic users, with one or more of word-level errors or sentence-level errors comprises a first social media post; and
   a corresponding corrected content object comprises a second social media post submitted by the dyslexic user to correct the first social media post.

4. The method of claim 1, further comprising: determining that the first user is dyslexic.

5. The method of claim 1, wherein the word-level errors comprises one or more of:
   words with swapping letters;
   words with omitting letters;
   foreshortening words;
   words omitting prefixes or suffixes; or
   words with capitalization issues.

6. The method of claim 1, wherein the sentence-level errors comprises one or more of:
   grammar errors;
   wrong prepositions;
   odd or no spacing between words;
   sentence fragment issues; or
   wrong punctuations.

7. The method of claim 1, further comprising:
   receiving, from the client system associated with the first user of the online social network, a request to post the text string on the online social network, wherein the corrected text string is presented on the client system as a suggestion to the first user in response to receiving the request.

8. The method of claim 7, further comprising:
   receiving, from the client system associated with the first user of the online social network, a confirmation from the first user accepting the corrected text string; and
   posting the corrected text string on the online social network.

9. The method of claim 1, further comprising:
   generating, using the machine-learning model, suggestions for correcting the one or more errors in the text string in real-time.

10. The method of claim 1, wherein transforming the text string into the vector representation preserves the semantic meaning of the text string.

11. The method of claim 1, further comprising:
    in response to receiving the text string, analyzing the text; and
    categorizing the text, based on the analysis, into one of a non-English text, a well-written text, an understandable but informal text, and a poorly-written text.

12. The method of claim 11, further comprising:
    determining that the text is categorized into the poorly-written text.

13. The method of claim 1, wherein the machine-learning model is a sequence-to-sequence model.

14. The method of claim 1, further comprising:
    parsing the text string into one or more n-grams, wherein the one or more n-grams comprises the one or more errors.

15. The method of claim 1, wherein the one or more n-grams are one or more of unigrams, bigrams, or trigrams.

16. One or more computer-readable non-transitory storage media embodying software that is operable when executed to:
    identify a plurality of dyslexic users on an online social network, wherein the plurality of dyslexic users are identified based on a set of content objects posted by the dyslexic users over a particular time period, the content objects posted by the dyslexic users comprising one or more of word-level errors or sentence-level errors;
    train a machine-learning model for text correction using a corpus of social network data, the social network data comprising at least the set of content objects posted by the dyslexic users with one or more of word-level errors or sentence-level errors, and a corresponding set of corrected content objects that are posted to replace the posted set of content objects;
    receive, from a client system associated with a first user of an online social network, a text string, the text string comprising one or more errors;
    transform, using an encoder of the machine-learning model, the text string into a vector representation;
    generate, using a decoder of the machine-learning model, a corrected text string from the vector representation, wherein the corrected text string has the one or more errors removed; and
    send, to the client system associated with the first user, instructions for presenting the corrected text string.

17. The media of claim 16, wherein the set of content objects posted by the dyslexic users comprises social media posts.

18. The media of claim 17, wherein:
a content object, posted by a dyslexic user from the plurality of dyslexic users, with one or more of word-level errors or sentence-level errors comprises a first social media post; and
a corresponding corrected content object comprises a second social media post submitted by the dyslexic user to correct the first social media post.

19. A system comprising: one or more processors; and a non-transitory memory coupled to the processors comprising instructions executable by the processors, the processors operable when executing the instructions to:
identify a plurality of dyslexic users on an online social network, wherein the plurality of dyslexic users are identified based on a set of content objects posted by the dyslexic users over a particular time period, the content objects posted by the dyslexic users comprising one or more of word-level errors or sentence-level errors;
train a machine-learning model for text correction using a corpus of social network data, the social network data comprising at least the set of content objects posted by the dyslexic users with one or more of word-level errors or sentence-level errors, and a corresponding set of corrected content objects that are posted to replace the posted set of content objects;
receive, from a client system associated with a first user of an online social network, a text string, the text string comprising one or more errors;
transform, using an encoder of the machine-learning model, the text string into a vector representation;
generate, using a decoder of the machine-learning model, a corrected text string from the vector representation, wherein the corrected text string has the one or more errors removed; and
send, to the client system associated with the first user, instructions for presenting the corrected text string.

20. The media of claim 19, wherein the set of content objects posted by the dyslexic users comprises social media posts.

* * * * *